L. D. & M. J. WIESE.
CAR TRUCK.
APPLICATION FILED JAN. 19, 1914.

1,116,775.

Patented Nov. 10, 1914.

WITNESSES:

INVENTORS
Ludwig D. Wiese
Mathilda J. Wiese
BY
L. L. Westfall
ATTORNEY

UNITED STATES PATENT OFFICE.

LUDWIG D. WIESE AND MATHILDA J. WIESE, OF SPOKANE, WASHINGTON.

CAR-TRUCK.

1,116,775.  Specification of Letters Patent.  Patented Nov. 10, 1914.

Application filed January 19, 1914. Serial No. 812,939.

*To all whom it may concern:*

Be it known that we, LUDWIG D. WIESE and MATHILDA J. WIESE, citizens of the United States of America, residing at Spokane, in the county of Spokane and State of Washington, have invented certain new and useful Improvements in Car-Trucks, of which the following is a specification.

This invention pertains to car trucks and has for its object to provide means whereby the wheels on each side of the truck may rotate independently of each other. We accomplish this purpose by providing a separate and distinct axle for each wheel. The desirability of independent rotation of each wheel is obvious, such as the preventing of the dragging of a portion of the wheels in going around a curve thereby saving power and preventing the wearing of the wheels and forming flat surfaces thereon.

The invention will be hereinafter particularly described and illustrated in the accompanying drawings, in which—

Figure 1:
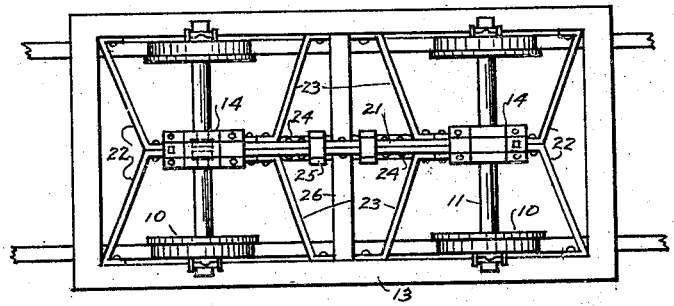
Figure 2:
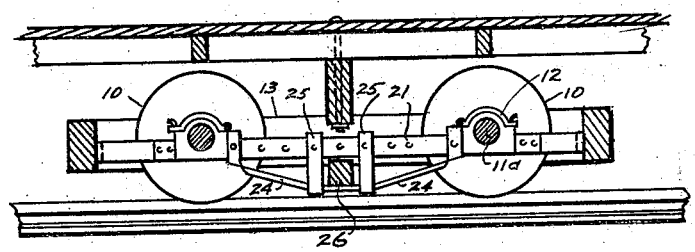
Figures 3, 4:
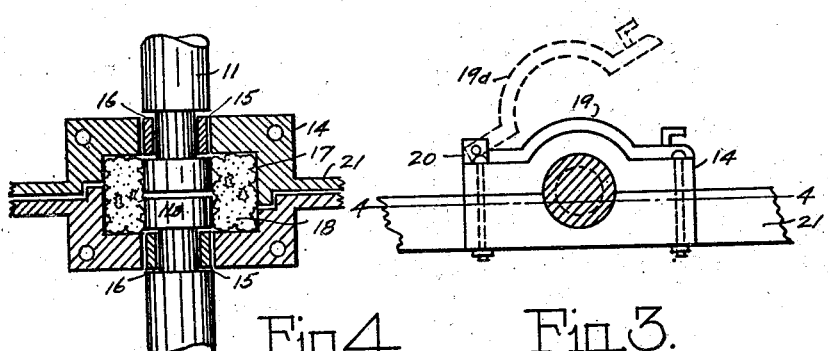
Figure 5:
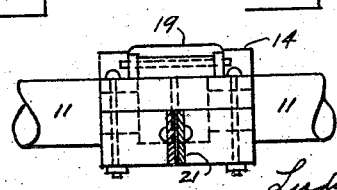

Figure 1, is a top plan view of the improved truck resting upon broken-away portions of rails, Fig. 2, is a side elevation of the same and a broken-away sectional view of the base of the car body to which the truck is attached, Fig. 3, is a side view of the boxing in which inner ends of the axles are journaled together with a sectional view of one of the axles, showing also by dotted lines the open position of the cap to the boxing, Fig. 4, is a sectional view taken on the line 4—4 of Fig. 3, and Fig. 5, is an end view of the said boxing together with broken-away views of two shafts journaled therein.

In a detail description in which like numerals refer to like parts throughout the several views, the wheels 10 are of usual construction with the outer ends 11$^a$ of the axles 11 journaled as usual in the boxings 12 of the frame 13. Centrally disposed within the truck are boxings 14 into each side of which is journaled the inner end of an axle 11. Hubs 15 are formed near the inner ends of the axles 11 smaller in diameter than the main body of the axles with the extreme inner ends 11$^b$ of the axles 11 of equal or near equal diameter with the main body of the same. Suitable bushings 16 are provided for the hubs 15.

A cavity 17 is provided in the boxing 14 and is filled with packing 18 to be saturated with grease to lubricate the axle portions, such as the hubs 15 and ends 11$^b$. The boxing cap 19 is hinged, as at 20, in order that the same may be conveniently elevated as shown by the dotted lines 19$^a$, Fig. 3, for the purpose of oiling and replacing the bushing 18.

When a four or six wheeled truck is used, extensions 21 from the boxings 14 join the boxings together for strength and stability, as shown in Fig. 1. The boxings 14 and extensions 21 are suitably braced and supported by the parts 22 and 23 reaching therefrom and joined to the frame 13 and the parts 24 reaching therefrom and connected with the parts 25 reaching from the frame 13. The braces 24 engage the under side of the bolster 26.

What is claimed is,

A car truck comprising a frame, axles reaching from each side and extending halfway across the frame, boxings arranged within the frame in which boxings are journaled the outer ends of said axles, boxings having bearings on each side thereof oppositely disposed, centrally located within said frame in which are journaled the inner ends of the axles carrying said wheels, together with means for retaining said axles within said bearings and means for supporting said centrally located boxings in place, such means comprising struts horizontally arranged and reaching from one boxing to the other and beyond the same and braces reaching from said struts to and connected with the said frame.

In testimony whereof we affix our signatures in presence of two witnesses.

LUDWIG D. WIESE.
MATHILDA J. WIESE.

Witnesses:
GEO. E. CANFIELD,
H. M. WILEY.